Nov. 3, 1959    R. B. MATTHEWS ET AL    2,911,183
MAGNETIC VALVES
Filed April 7, 1955    3 Sheets-Sheet 1

INVENTORS
RUSSELL B. MATTHEWS
ROBERT A. MERRELL
BY
ATTORNEYS

Nov. 3, 1959 R. B. MATTHEWS ET AL 2,911,183
MAGNETIC VALVES
Filed April 7, 1955 3 Sheets-Sheet 2

INVENTORS
RUSSELL B. MATTHEWS
ROBERT A. MERRELL
BY
*Seegert & Schwallbach*
ATTORNEYS

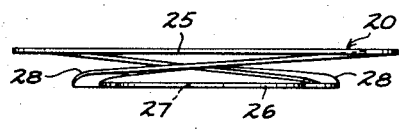
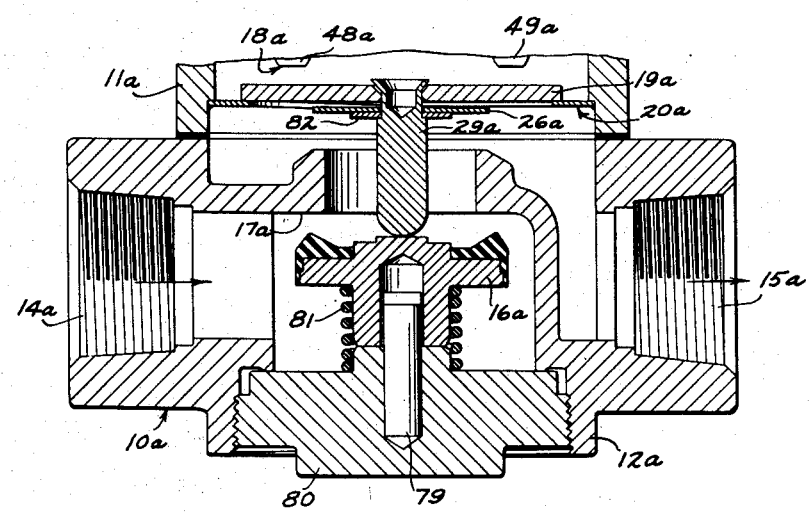

United States Patent Office 2,911,183
Patented Nov. 3, 1959

2,911,183

MAGNETIC VALVES

Russell B. Matthews, Wauwatosa, and Robert A. Merrell, Pewaukee, Wis., assignors to Baso Inc., Milwaukee, Wis., a corporation of Wisconsin Application April 7, 1955, Serial No. 499,932

15 Claims. (Cl. 251—137)

This invention relates to improvements in magnetic valves.

Solenoid type valves have found relatively wide usage in the art of fluid fuel control but they have a number of undesirable characteristics. For example, a solenoid necessarily utilizes a plunger of relatively large mass which must travel through a relatively long stroke. The impact of said plunger against a stop at the end of its stroke creates undesirable noise, and as the plunger moves within the plunger tube it creates sliding friction which not only produces rapid wear of the sliding parts, but it also decreases the efficiency of the unit by requiring power to overcome said friction. Further, conventional solenoid valves are positional and must be mounted in a particular position in order that gravity can be relied on for closure thereof on deenergization. Still other factors to be considered are the facts that expensive components and fabrication procedures must be employed in the manufacture of conventional solenoid valves, and that said valves require a relatively large amount of power for operation.

With the above in mind, it is a general object of the present invention to provide an improved magnetic valve which is quiet in operation and has an efficient magnetic structure requiring a relatively small amount of power.

Another object of the invention is to provide an improved magnetic valve of the class described wherein controlling movements of the movable parts thereof are effected without sliding friction, thereby increasing efficiency and preventing wear.

Still another object of the invention is to provide improved magnetic valve of the aforementioned character which is both compact and non-positional, said valve having embodied therein an electromagnet and a coacting armature of relatively small mass movable with a relatively short stroke between retracted and attracted positions with respect to said electromagnet, there being a valve member operatively connected to said armature and to a guiding and biasing member, the latter affording said valve member substantial sealing force and at the same time guiding said armature and valve member in their controlling movements without sliding friction.

Another object of the invention is to provide an improved magnetic valve of the character described which is operable on alternating current and in which, when the armature is in attracted position, noise and vibration are eliminated by means comprising the aforementioned guiding and biasing member which is of a character to exert a substantially smaller biasing force on the valve member and armature when the armature is in attracted position than it does when said valve member is in closed position.

Still another object of the invention is to provide an improved magnetic valve of the class described having a partitioned control body formed with first and second chambers, the electromagnet being disposed in one of said chambers and fixed to an adjustable cover for said chamber, said electromagnet having a frame provided with leg portions projecting through said partition into the second chamber for coaction with the armature and valve member, adjustment of the position of said chamber cover affording adjustment of the position of the electromagnet and hence adjustment of the air gap between the armature and the coacting pole faces of said electromagnet when the armature is in retracted position as well as adjustment of the open position of said valve member.

Another object of the invention is to provide an improved magnetic valve of the aforementioned character wherein the electromagnet frame legs each terminate in pole pieces and wherein novel shading plate means is provided in the second chamber for shading coaction with said pole pieces and also for coaction with sealing means surrounding said legs within said second chamber to afford an hermetic seal between said chambers.

A further object of the invention is to provide an improved magnetic valve of the character described wherein the efficiency of the electromagnetic structure is increased by virtue of the fact that the pole faces of the electromagnet are ground to a common plane and the face of the armature coacting with said pole faces is also ground to a plane surface.

Other objects and advantages of the invention will become apparent as the description proceeds, reference being had to the drawings accompanying and forming a part of this specification, wherein:

Figure 5 is a side elevational view of the guiding and biasing member; and

Figure 6 is a fragmentary sectional view similar to Figure 2 taken through a normally open type valve constructed in accordance with the invention.

Figure 1:
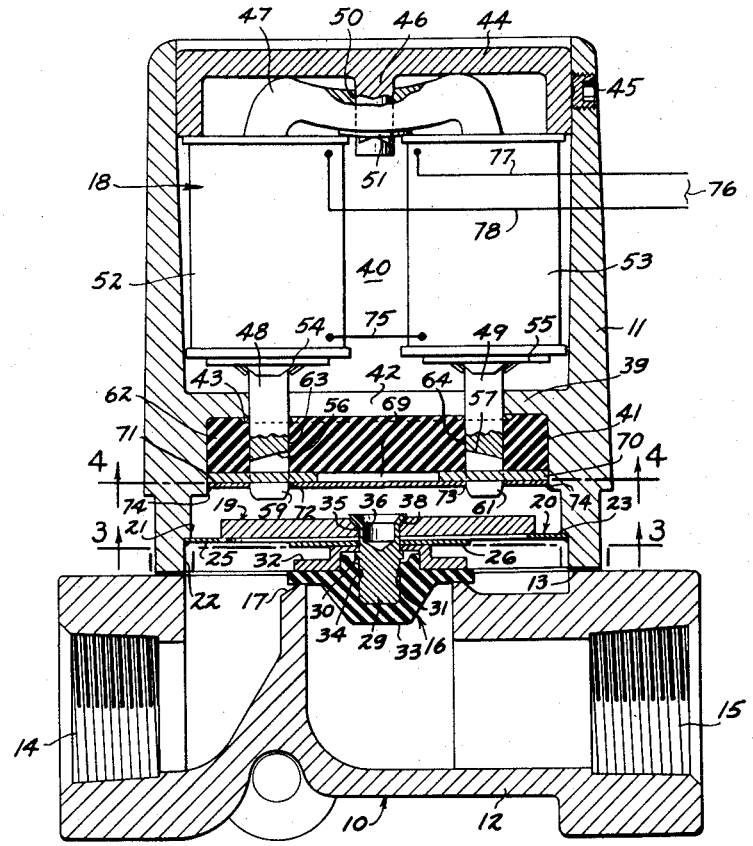
Figure 1 is a vertical sectional view through one form of magnetic valve constructed in accordance with the teachings of the present invention and showing the valve member in closed position.

Referring more particularly to Figure 1 of the drawings, the magnetic valve illustrated therein comprises a valve body 10 which may be formed of body sections 11 and 12 sealingly joined, as through a gasket 13. The body section 12 is provided with a fuel inlet connection 14 and a fuel outlet connection 15, and fuel flow between said inlet and outlet is under the control of a valve member 16 which coacts with an annular valve seat 17. Actuation of the valve member 16 is provided by an electromagnetic operator comprising an electromagnet 18, an armature 19 and a guiding and biasing member 20, all of which will be described in detail hereinafter.

Figure 3:
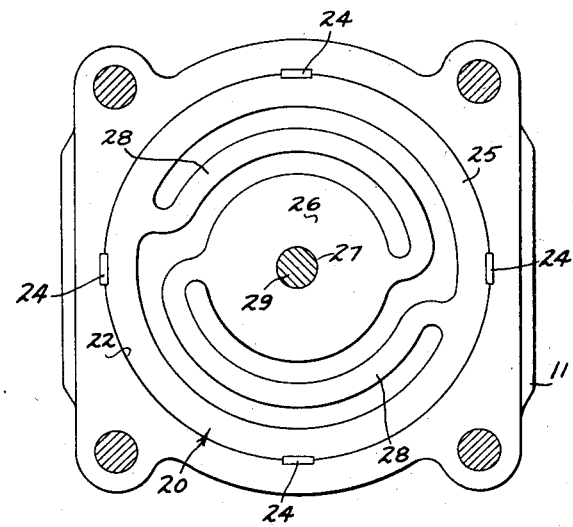
Figure 3 is a sectional view taken along the line 3—3 of Figure 1 and showing the guiding and biasing member in plan view.

The body section 11 is preferably generally tubular in shape, and is provided with a bore 21 and counterbore 22 forming an annular shoulder 23 against which peripheral portions of the guiding and biasing member 20 are seated, said portions being preferably fixedly held in operative position by staking 24 (see Figure 3) or other suitable means. The guiding and biasing member 20 is formed from relatively thin flat metal having spring-like qualities, for example beryllium copper or 17-7 precipitation hardened stainless steel. As shown in Figure 3, the member 20 has an annular peripheral portion 25 and a circular central portion 26 formed with a central aperture 27. In the illustrated member 20, the central portion 26 is connected to the peripheral portion 25 by a pair of arcuate arm portions 28 which are joined to the central portion 26 at diametrically opposite peripheral points and extend generally concentrically with respect to said central portion somewhat less than 180° and are joined with the peripheral portion 25 at diametrically opposite points. Figure 5 shows the member 20 removed from the assemblage and in an unstressed state. It will be observed that in Figure 5 the central portion 26 is offset axially a substantial distance from the plane of the peripheral portion 25. The member 20 may be stamped out of flat or sheet stock, and in order to give the latter the conformation shown in Figure 5, said member is placed in a jig to hold it in the desired shape shown during a heat treating operation. Thereafter the normal unstressed shape of the member 20 is as shown in Figure 5.

A valve stem 29 projects through the aperture 27 in the central portion 26 of the member 20 and is provided with an external annular rib or shoulder 30 as well as with an external peripheral groove 31 (see Figure 1). The valve member 16 comprises a peripherally flanged cup-shaped backing and retaining member 32 which is centrally apertured to receive the stem 29 and is interposed between the portion 26 of the member 20 and the annular shoulder 30, as shown. Valve member 16 also comprises a snap-on type facing member 33 having a peripheral flange portion overlying the flanged portion of the member 32 and having a cylindrical cavity for receiving the stem 29, said cavity being provided with an annular rib 34 for interlocking engagement with the groove 31 in the stem 29. A generally cylindrical portion of a facing member 33 also extends within the cup-shaped member 32 and is prevented thereby from radial spreading which might tend to disengage the rib 34 from the groove 31.

It will be observed that the axial distance between the central portion 26 of the guiding and biasing member 20 and the peripheral portion 25 of said member is substantially greater in the unstressed condition of said member shown in Figure 5 than it is in the operative position of said member shown in Figure 1. Because of this axial compression, the member 20, by engagement of the portion 26 thereof with the backing and retaining member 32, biases the valve member 16 toward the closed position shown with substantial sealing force.

The armature 19 is formed of magnetically permeable steel, for example the alloy designated by the numeral 4750, and is preferably circular in shape and formed with a central aperture 35 through which the stem 29 projects. The stem 29 is formed with an end bore 36; and, adjacent said end bore, said stem terminates in a radially outwardly flanged portion 37. The margin of the armature aperture 35 adjacent the flange 37 is formed with an annular bevel 38 which is substantially parallel with said flange, and when the parts are in the position shown in Figure 1, said bevel is spaced axially from said flange. The margin of opposite end of the aperture 35 is bevelled as shown, and the armature 19 has a loose sliding fit on the stem 29, the spacing between the flange 37 and the bevelled surface 38 permitting of lost motion between the armature 19 and the stem 29 for a purpose to be described hereinafter. The surface of the armature 19 facing the electromagnet 18 is ground to a flat surface.

The upper casing section 11 is formed of non-magnetic material, for example aluminum, and has a transverse partition 39 separating a tapered rectangular outer chamber or cavity 40 from a rectangular cavity 41 communicating with the bore 21 as shown. The partition 39 is formed with a generally H-shaped slot 42, the margin of which is formed, in the cavity 41, with a rounded bead 43 shown most clearly in Figure 1. The open outer end of the chamber 40 is closed by an adjustable cup-shaped cover 44 formed with an integral axial lug 46 on which the electromagnet 18 is carried. The cover 44, and hence the electromagnet 18, are locked in a selected position by one or more set screws 45 threaded through the casing member 11 and engaging the periphery of said cover.

Electromagnet 18 comprises a generally U-shaped frame 47 of magnetically permeable steel, for example the alloy designated by the number 4750. The frame 47 has a pair of spaced parallel legs 48 and 49 which may be of rectangular cross-section, and the transverse portion connecting said legs is formed with an aperture 50 for receiving the lug 46 of the cover 44 as shown. The frame 47 is rigidly held against the cover 44 by a friction clip 51 pressed on the lug 46 or by other suitable means. Energizing coils 52 and 53 are mounted on the frame legs 48 and 49 respectively, said coils engaging peripheral portions of the cover 44 and the clip 51 at one end and being rigidly held in operative position by friction clips 54 and 55 pressed on the legs 48 and 49.

Figure 4:
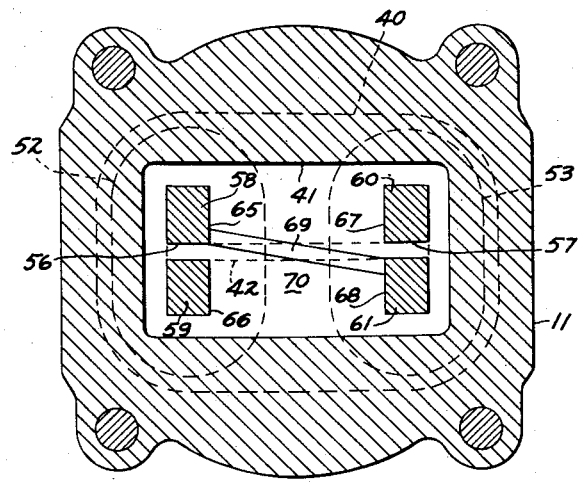
Figure 4 is a sectional view taken along the line 4—4 of Figure 1 and showing the shading plate in plan view.

As shown in Figure 1, the frame legs 48 and 49 extend through the spaced parallel portions of the H-shaped slot 42 and through the cavity 41. The end portions of the frame legs 48 and 49 are slotted, as at 56 and 57 respectively, so that each of said frame legs terminates in a pair of spaced pole pieces, the frame leg 48 terminating in pole pieces 58 and 59 (see Figure 4), and the frame leg 49 terminating in the pole pieces 60 and 61. The pole pieces 58 through 61 are ground to afford flat coplanar pole faces cooperable with the ground surface of the armature 19.

Disposed within the cavity 41 is a seal 62 of resilient material, for example synthetic rubber, said seal being apertured, as at 63 and 64 to snugly receive the magnet frame legs 48 and 49 as shown. It will be noted that the slots 56 and 57 in the frame legs 48 and 49 respectively terminate intermediate the thickness of the seal 62. Overlying the seal 62 within the cavity 41 is a rectangular shading plate 70, preferably of aluminum, for example the type of aluminum commonly designated 2SO. The plate 70 is formed with rectangular apertures 65, 66, 67 and 68 (see also Figure 4) for snugly receiving the pole pieces 58, 59, 60 and 61 respectively. Slot means is provided for preventing the plate 70 from affording any substantial shading for the pole pieces 58 and 61, said means taking the form of a slot 69 communicating with the apertures 65 and 68 as shown. Thus, the plate 70 provides a relatively short path for shading current around the pole pieces 59 and 60, but not about the pole pieces 58 and 61.

Overlying the shading plate 70 within the cavity 41 is a rectangular retainer plate 71 formed with rectangular apertures 72 and 73, the aperture 72 receiving the pole pieces 58 and 59 and the aperture 73 receiving the pole pieces 60 and 61. The retainer plate 71 is preferably formed of material of relatively high electrical resistance as compared with that of the shading plate 70, for example stainless steel. The retainer plate 71 is peripherally staked, as at 74, to hold the latter in operative position wherein it acts through the shading plate 70 to plate the seal 62 under compression to afford a hermetic seal between the cavities 41 and 40 at the slot 42 and around the magnet frame legs 48 and 49. Where the improved valve is to be powered by direct current only the shading plate 70 need not be used, in which case the retainer plate 71 engages the seal 62 directly to place the latter under compression.

It will be observed in Figure 1 that the ends of the magnet frame legs 48 and 49 are somewhat rounded. The reason for this is to permit said frame legs to be easily inserted through the slot 42 and for said legs to be inserted through the apertures in the seal 62 and plates 70 and 71 as said seal and plates are placed in the cavity 41. After said seal and plates have been staked into the operative position shown, the position of the cover 44, and hence of the electromagnet 18, is adjusted until the pole faces of the pole pieces 58, 59, 60 and 61 are uniformly disposed at the proper distance from the ground face of the armature 19 when the latter is in the retracted position shown in Figure 1. When the electromagnet 18 and the cover 44 are in the desired operative position, they are locked in said position by securing the set screws 45.

The energizing coils 52 and 53 are connected in series circuit relation by means of a conductor 75 and are wound in a manner to aid one another in the production of magnetic flux flow in the frame 47. The ends of the coils opposite those connected by the conductor 75 may be connected to a source of electric energy, for example the alternating current source 76, by means of conductors 77 and 78, all of said electrical connections being illustrated schematically in Figure 1.

The operation of the improved electromagnetic valve will now be discussed. With the parts disposed in the positions shown in Figure 1, energization of the coils 52 and 53 causes the latter to produce a flux flow in the electromagnet frame 47 and across the air gaps between the armature 19 and the pole faces of the pole pieces 58, 59, 60 and 61, said flux linking the armature and exerting an attractive force tending to reduce said air gaps. This attractive force varies exponentially with the size of the air gaps and is smallest when the armature is in its retracted position shown in Figure 1. Initially, this attractive force is utilized to lift the armature 19, causing the latter to lift freely along stem 29 until the bevelled surface 38 thereof engages the flange 37 of said stem. At this point the armature 19 has attained a certain momentum aiding the increasing attractive force. As the bevelled surface 38 engages the flange 37, the valve member 16 and its stem 29 are lifted against the bias of the guiding and biasing member 20. As the armature 19 moves into engagement with the coplanar pole faces of the pole pieces 58, 59, 60 and 61, the valve member 16 moves to the open position shown in Figure 2.

Figure 2:
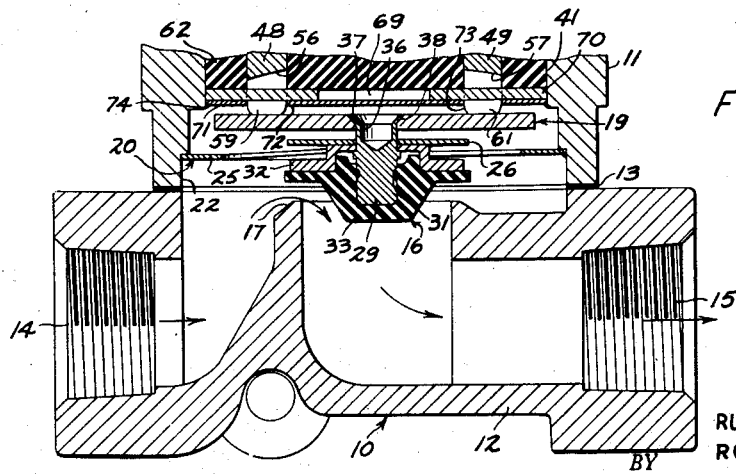
Figure 2 is a fragmentary vertical sectional view similar to Figure 1 and showing the valve member in open position.

It will be observed by comparing Figures 1 and 2, that the central portion 26 of the guiding and biasing member 20 moves from a downwardly convexed position in Figure 1, to an upwardly convexed over-center position. In so moving, the portion 26 guides the valve member 16 and the armature 19 in a straight line path without any sliding friction of the moving parts.

In order to avoid noise and vibration which might otherwise occur when the armature 19 is held in attracted position, while at the same time insuring substantial sealing force for the valve member 16 when the latter is closed, the guiding and biasing member 20 is of a character to exert a predetermined sealing force on the valve member 16 when it is closed and to exert a predetermined smaller force in the same direction on said valve member and the armature 19 when the valve member is in open position and the portion 26 is in the over-center position of Figure 2. This negative spring characteristic reduces the attractive force which the electromagnet must exert in order to hold the armature 19 in attracted position and the valve member 16 in open position, and it thereby avoids any noise and vibration which might occur in the absence of such a characteristic. To insure that the armature 19 is firmly held in attracted position when the electromagnet is energized, the shading plate 70 affords shading of the pole pieces 59 and 60, said plate serving the additional function of acting as a gland member for compression of the seal 62.

On deenergization of the electromagnet, the guiding and biasing member 20, acting through the valve member 16 and stem 29, pulls the armature 19 away from the pole faces of the magnet frame and biases the parts to the position shown in Figure 1. As the portion 26 of the member 20 approaches the position of Figure 1, its biasing force builds up to the point where it exerts substantial sealing force on the valve member 16. The armature 19 moves along the stem 29 to its position in Figure 1 as the valve member 16 moves to closed position, so that the weight of the armature adds to the sealing force exerted on the valve member 16 and the armature bevelled surface 38 moves away from the flange 37 to again permit lost motion between the armature and the stem, on subsequent energization of the electromagnet 18.

The aforedescribed operation takes place when the improved magnetic valve is mounted in the upright position shown in Figure 1. The improved valve operates equally well, however, when mounted in any other position including inverted position. When the valve is inverted, gravity causes the armature to continually engage the flange 37 so that there is no lost motion therebetween. The absence of said lost motion is compensated for, however, by the fact that when the valve is inverted the weight of the armature reduces, rather than adds to, the sealing force exerted on the valve member 16 by the guiding and biasing member 20, thus reducing the amount of work required to open the valve member 20.

The improved magnetic valve is inexpensive in both cost of the elements thereof and in the fabrication of said elements into the complete device. For example, the improved magnetic structure permits of the use of relatively small coils 52 and 53 which require a relatively small amount of wire as compared, for example, with the amount of wire required for a solenoid valve of comparable capacity, and expensive brazing or similar operations are not required in its manufacture. Further tests have shown that actuation of the improved valve requires less than half of the power required by a solenoid valve of comparable capacity. Compactness is lent to the improved structure by small axial space required by the novel guiding and biasing spring 20 as well as by the fact that the armature 19 has a relatively short lift, for example, as compared with the relatively large lift required for the plunger of a solenoid valve of similar capacity. Further, the aforementioned short lift combined with the relatively small mass of the armature 19 reduces operational noise by virtue of the relatively light impactual engagement of said armature with the pole faces of the magnet frame 47 on energization of the electromagnet 18 as compared with the impact of a relatively heavy solenoid plunger against a stop at the end of its relatively long power stroke. The substantially frictionless movement of the movable parts of the improved magnetic valve not only increases the efficiency thereof to thereby reduce the power required for operation, but it also eliminates the abrading action produced by sliding friction as commonly produced, for example, by the sliding friction of a solenoid plunger in a solenoid plunger tube.

Figure 6 illustrates a normally open magnetic valve constructed in accordance with the present invention as distinguished from the normally closed type of valve illustrated in Figures 1 and 2. In Figure 6 the parts indicated by reference characters bearing the suffix "a" correspond to parts in Figures 1 to 5 indicated by the same reference characters without a suffix. In Figure 6 a valve member 16a is axially slidable on a tapered stem 79 carried by a plug 80 threaded into a suitable aperture in the valve body section 12a as shown. The valve member 16a is biased toward a flat annular valve seat 17a by a coiled compression spring 81. The stem 29a has an upper end similar to the upper end of the stem 29 in Figure 1, and the lower end of said stem is elongated and it projects through the valve port formed by the seat 17a and into engagement with the valve member 16a as shown.

The guiding and biasing member 20a, acting through a washer 82, biases the stem 29a toward the valve member 16a with greater force than the spring 81 biases said valve member toward the seat 17a, so that when the electromagnet 18a is deenergized, the armature 19a assumes the retracted position shown in Figure 6, and the valve member 16a is held open against the bias of the spring 81 by the guiding and biasing member 20a. On energization of the electromagnet 18a, however, the attractive force exerted on the armature 19a by the generated flux, together with the bias of the spring 81, is sufficient to overcome the bias of the member 20a and move the armature into engagement with the pole faces of the electromagnet and permitting the spring 81 to bias the valve member 16a into sealing engagement with the valve seat 17a with substantial sealing force.

When the armature 19a is in attracted position, the stem 29a may be out of engagement with the valve member 16a, and the central portion 26a of the guiding and biasing member 20a is in the over-center position corresponding to the position of the portion 26 shown in Figure 2. In this position the biasing force exerted by the member 20a on the stem 29a is substantially reduced by virtue of the negative spring characteristic of the member 20a which may be substantially the same as that of the member 20. On subsequent deenergization of the electromagnet 18a, the guiding and biasing member 20a returns the parts to the position shown in Figure 6 against the bias of the spring 81.

Having thus described two embodiments of the improved magnetic valve structure, it is to be understood that the illustrated forms were selected to facilitate the disclosure of the invention rather than to limit the number of forms which the invention may assume. Various modifications, adaptations and alterations may be applied to the specific forms shown to meet the requirements of practice, without in any manner departing from the spirit or scope of the present invention, and all of such modifications, adaptations and alterations are contemplated as may come within the scope of the appended claims.

What is claimed as the invention is:

1. In an electromagnetic operator having an electromagnet and having an armature movable between attracted and retracted positions with respect to said electromagnet, means biasing said armature away from said electromagnet comprising spring means exerting a predetermined biasing force upon said armature when the latter is in a retracted position and a predetermined lower biasing force in the same direction on said armature when the latter is in attracted position, said spring means comprising a normally concavo-convex member having a movable central portion connected to said armature for movement therewith, said central portion being movable to an over-center position by movement of said armature to said attracted position.

2. A control device comprising, a guiding and biasing member of resilient sheet material supported at spaced points and having a movable portion intermediate said spaced points, and actuating member operatively connected to said movable portion and biased thereby toward a first position, and a power unit energizable to move said actuating member against said bias, the connection of said actuating member to said movable portion causing movement of said movable portion with said actuating member, said movable portion affording said actuating member friction free guidance along a substantially straight line path between said first position and a second position, said guiding and biasing member being normally concavo-convex in shape and exerting a predetermined bias on said actuating member when the latter is in its first position, the movable portion of said biasing member being movable, by movement of said actuating member to its second position, to an over-center position wherein said biasing member exerts a predetermined smaller biasing force on said actuating member in the same direction.

3. A control device comprising, a peripherally supported guiding and biasing member of resilient sheet material having a movable central portion and having a plurality of arcuate arm portions connecting said central portion and peripheral portions of said member at angularly offset points, an actuating member operatively connected to said movable portion and biased thereby toward a first position, and a power unit energizable to move said actuating member against said bias, the connection of said actuating member to said movable portion causing movement of said movable portion with said actuating member, said movable portion affording said actuating member friction free guidance along a substantially straight line path between said first position and a second position, said guiding and biasing member being normally concavo-convex in shape and exerting a predetermined bias on said actuating member when the latter is in its first position, the movable portion of said biasing member being movable, by movement of said actuating member to its second position, to an over-center position wherein said biasing member exerts a predetermined smaller biasing force on said actuating member in the same direction.

4. An alternating current electromagnetic operator comprising an electromagnet having a frame provided with a pair of spaced legs each provided with a pair of pole pieces, an armature movable between a retracted position and an attracted position in engagement with each of said pole pieces, means biasing said armature away from said pole pieces, said means exerting a predetermined biasing force upon said armature when the latter is in a retracted position and exerting a predetermined lower biasing force in the same direction on said armature when the latter is in attracted position, and shading means comprising a shading ring portion for one of each pair of said pole pieces.

5. An alternating current electromagnetic operator comprising an electromagnet having a frame provided with a pair of spaced legs each provided with a pair of pole pieces, an armature movable between a retracted position and an attracted position in engagement with each of said pole pieces, and shading means comprising a shading plate having a separate aperture for receiving each of said pole pieces, said plate being formed with slot means communicating with the aperture for one of each of said pairs of pole pieces and preventing flow of any substantial shading current in said plate around the pole pieces in said communicating apertures.

6. An electromagnetic control device comprising a control body having a first chamber and a second chamber, said body having an apertured partition between said chambers, an electromagnet in said second chamber having a frame provided with at least one leg projecting through an aperture in said partition and terminating in a pair of spaced pole pieces within said first chamber, sealing means of resilient material overlying said partition within said first chamber and having an aperture through which said leg snugly projects, and a shading plate apertured to receive said pole pieces overlying and compressively stressing said sealing means to effect an hermetic seal between said chambers around said leg.

7. An electromagnetic control device comprising a control body having a first chamber and a second chamber, said body having an apertured partition between said chambers, an electromagnet in said second chamber having a frame provided with a pair of spaced legs projecting through apertures in said partition and each terminating in a pair of spaced pole pieces within said first chamber, sealing means of resilient material overlying said partition within said first chamber and having a pair of apertures through which said legs snugly project, and a shading plate apertured to receive said pole pieces overlying and compressively stressing said sealing means to effect an hermetic seal between said chambers around said legs.

8. A control device comprising a control body having a first chamber and a second chamber, said body having an apertured partition between said chambers, an adjustable cover for said second chamber, a magnet within said second chamber operatively connected to said cover and movable therewith and comprising a frame provided with at least one leg projecting through an aperture in said partition and terminating in at least one pole face within said first chamber, an armature in said first chamber movable between retracted and attracted positions with respect to said pole face, and means for securing said cover and hence said frame in a selected position, adjustment of the position of said cover and frame effecting adjustment of the air gap between said pole face and armature when the latter is in its retracted position.

9. Guiding and biasing means for use in an electromagnetic operator or the like comprising a normally concavo-convex member of resilient sheet material having a movable central portion and having a plurality of arcuate arm portions connecting said central portion and peripheral portions of said member at points offset angularly more than 90°, said central portion being movable with deformation of said member from its normal position to an over-center position, said member being unstable in said over-center position and resisting such deformation with decreasing force as said central portion moves through center to said over-center position.

10. An alternating current electromagnetic operator comprising relatively movable armature and electromagnet means, said electromagnet means having a plurality of spaced legs each provided with a plurality of pole pieces, and apertured shading means associated with said electromagnet means and having a separate aperture for receiving each of said pole pieces, said shading means being formed with opening means communicating with the aperture for one pole piece of each of said legs and preventing flow of any substantial shading current in said shading means around the pole pieces in the apertures connected by said opening means.

11. An electromagnetic control device comprising a control body having a first chamber and a second chamber, said body having an apertured partition between said chambers, an electromagnet in said second chamber having a frame provided with at least one leg projecting through said partition aperture and extending into said first chamber, sealing means of resilient material overlying said partition within said first chamber and having an aperture through which said leg snugly projects, and a shading means apertured to receive said projecting leg overlying and compressively stressing said sealing means to effect an hermetic seal between said chambers around said leg.

12. An electromagnetic valve comprising a control body having a first chamber and a second chamber, an electromagnet in said second chamber having a frame provided with at least one leg projecting into said first chamber and terminating in pole face means, partition and sealing means separating said chambers in sealed relation and through which said at least one leg sealingly projects, shading means apertured to receive said at least one projecting leg overlying said partition and sealing means within said first chamber, an armature in said first chamber rectilinearly movable between attracted and retracted positions with respect to said pole face means, a valve member connected to said armature and movable coaxially therewith to open and closed positions by movement of said armature to attracted and retracted positions respectively, and a circular guiding and biasing member peripherally fixed within said valve body and having a movable central portion interposed between said armature and valve member and continuously engaging said valve member to bias the latter toward closed position and thereby said armature toward retracted position.

13. A control device comprising a control body having an opening, an adjustable cover for said opening, magnet means within said body operatively connected to said cover and movable therewith and comprising a frame terminating in at least one pole face, said opening being of a size to permit passage therethrough of said magnet means, armature means in said body movable between retracted and attracted positions with respect to said pole face, and means for securing said cover and hence said frame in a selected position, adjustment of the position of said cover and thereby of said frame effecting adjustment of the air gap between said pole face and armature when the latter is in its retracted position.

14. A control device comprising a control body having chamber means and having an opening communicating with said chamber means, adjustable cover means for said opening, operator means within said chamber means comprising relatively movable magnetic members at least one of which is operatively connected to said cover for movement therewith, said opening being of a size to permit passage therethrough of the magnetic member connected to said cover, the other of said magnetic members being movable between attracted and retracted positions with respect to said one magnetic member, and means for securing said cover means and hence said one magnetic member in a selected position, adjustment of the position of said cover means effecting adjustment of the air gap between said magnetic members when said other magnetic member is in its retracted position.

15. An electromagnetic valve, comprising a normally concavo-convex guiding and biasing member of resilient sheet material supported at spaced points and having a movable portion intermediate said spaced points movable against the bias of said member to an overcenter position, a disc type armature operatively connected to and wholly on one side of said movable portion and movable therewith, a valve member operatively connected to the other side of said movable portion for movement therewith, a valve seat, said guiding and biasing member continually biasing said armature and valve member toward a first position wherein said valve member sealingly engages said seat with predetermined force, and an electromagnet having a U-shaped core formed with coplanar pole faces parallel with said armature disc operable when energized to move said armature and valve member against said bias to a second position wherein said armature is in attracted position in engagement with said pole faces, the connection of said armature and valve member to said movable portion causing overcenter movement of said movable portion with movement of said armature and valve member to said second position, said movable portion affording said armature and valve member friction free guidance along a substantially straight line path between said first and second positions.

References Cited in the file of this patent

UNITED STATES PATENTS

| | | |
|---|---|---|
| 258,500 | Storer | May 23, 1882 |
| 409,170 | Wheeler | Aug. 20, 1889 |
| 1,090,893 | Van Ness | Mar. 24, 1914 |
| 1,567,190 | Reisner | Dec. 29, 1925 |
| 1,571,401 | Erickson | Feb. 2, 1926 |
| 1,605,824 | Erickson | Nov. 2, 1926 |
| 1,700,029 | Dady | Jan. 22, 1926 |
| 2,114,961 | Gille | Apr. 19, 1938 |
| 2,289,456 | Ray | July 14, 1942 |
| 2,294,421 | Ray | Sept. 1, 1942 |
| 2,325,193 | Nutt | July 27, 1943 |
| 2,325,878 | Ray | Aug. 3, 1943 |
| 2,358,828 | Ray | Sept. 26, 1944 |
| 2,571,170 | Stilwell | Oct. 16, 1951 |
| 2,596,409 | Johnson | May 13, 1952 |
| 2,631,612 | Buescher | Mar. 17, 1953 |
| 2,651,744 | Acklin | Sept. 8, 1953 |
| 2,714,141 | Urey | July 26, 1955 |
| 2,738,450 | Matthews | Mar. 13, 1956 |
| 2,833,508 | Bydalek | May 6, 1958 |